(12) United States Patent
Sage

(10) Patent No.: US 6,397,226 B1
(45) Date of Patent: May 28, 2002

(54) SYSTEM AND METHOD FOR INVENTORY CONTROL BASED ON INVENTORY AGING

(76) Inventor: Mike Sage, 4309 Cezanne Ave., Woodland Hills, CA (US) 91364

( * ) Notice: Subject to any disclaimer, the term of this patent is extended or adjusted under 35 U.S.C. 154(b) by 44 days.

(21) Appl. No.: 09/589,623

(22) Filed: Jun. 7, 2000

(51) Int. Cl.[7] .............................................. G06F 17/30
(52) U.S. Cl. ....................... 707/104.1; 705/26; 705/27; 705/28; 705/22; 707/6; 707/3; 707/1
(58) Field of Search ............................. 705/26, 27, 28, 705/22; 707/1, 3, 6, 104.1

(56) References Cited

U.S. PATENT DOCUMENTS

| | | | | |
|---|---|---|---|---|
| 4,992,940 A | * | 2/1991 | Dworkin ..................... 235/383 |
| 5,351,186 A | * | 9/1994 | Bullock et al. ................. 705/1 |
| 5,978,776 A | * | 11/1999 | Seretti et al. .................. 705/26 |
| 6,041,310 A | * | 3/2000 | Green et al. ................... 705/26 |
| 6,092,053 A | * | 7/2000 | Boesch ........................ 705/10 |
| 6,236,977 B1 | * | 5/2001 | Verba et al. ................... 705/10 |
| 6,253,188 B1 | * | 6/2001 | Witek et al. ................... 705/14 |
| 6,298,331 B1 | * | 10/2001 | Walker et al. .................. 705/1 |

OTHER PUBLICATIONS

Dialogue search; comsci, patents, electron, eecomp, allbusiness.*

West; (inventor$ near4 age) and (vehicle or automobile or car or truck), (best near4 profit) and 705/26–28.*

* cited by examiner

Primary Examiner—Paul R. Lintz
Assistant Examiner—Soon Bigbie
(74) Attorney, Agent, or Firm—John E. Halamka; Fish & Richardson P.C.

(57) ABSTRACT

A method, computer program and system, for performing computer-based on-line commerce for goods having an excess inventory age is provided. The method, program and system include receiving information about a plurality goods from at least one vendor, wherein the information includes inventory age; compiling the information from the vendor to form a database; processing a request from a consumer regarding goods by comparing the request to the database; identifying goods fitting the request having an excess inventory age that exceeds an age of best profit; and using the information associated with the goods that best fit the request.

15 Claims, 3 Drawing Sheets

SYSTEM AND METHOD FOR INVENTORY CONTROL BASED ON INVENTORY AGING

FIELD OF THE INVENTION

The invention relates to computer-based on-line commerce, where a computer user buys goods or services.

BACKGROUND OF THE INVENTION

There has been an explosive growth in the use of the globally-linked network of computers known as the Internet, and in particular of the World Wide Web (the "Web"). The increased use of the Web has changed the way people work and play and has begun to make an impact on the way business is conducted throughout the world.

Such changes in business include the purchasing and selling of goods. The ability to move goods from warehouse to market to consumer is important in minimizing inventory costs associated with depreciation of goods, stocking costs, and maintenance costs. Accordingly, as goods remain in inventory, profits recognized upon sale of the goods decrease due to the inventory costs mentioned above. In order to reduce the loss in profits, sellers tend to reduce the price of goods that have exceeded an optimal time in inventory. Thus, the inventors have determined that there is a need on the part of sellers both to move goods out of inventory in an expedited manner and to identify those goods having a lower price.

SUMMARY OF THE INVENTION

The invention provides methods, systems and computer programs for on line commerce of goods. In particular the methods, systems and programs of the invention process, retrieve and identify information regarding goods having an excess inventory age.

Accordingly, in a first embodiment the invention provides a method of performing computerbased on-line commerce of goods, comprising receiving information about a plurality goods from at least one vendor, wherein the information includes inventory age; compiling the information from the vendor to form a database; processing a request from a consumer regarding goods by comparing the request to the database; identifying goods fitting the request having an excess inventory age that exceeds an age of best profit; and using the information associated with the goods that best fit the request.

In another embodiment, the invention provides a computer program stored on a computer readable storage medium, comprising instruction to cause a computer to: receive a request for goods from a client computer, wherein the request comprises information related to a desired good; compare the request to a database, the database comprising information regarding goods including an inventory age report associated with the goods and the location of the goods; make decisions as to which goods best fit the request from the client computer; identify goods fitting the request having an excess inventory age that exceeds an age of best profit for the good; and use the information associated with the goods that best fit the request from the client computer. In yet another embodiment the invention provides a system for performing function defined above.

DETAILED DESCRIPTION OF THE INVENTION

Commerce on the Web

Figure 1:
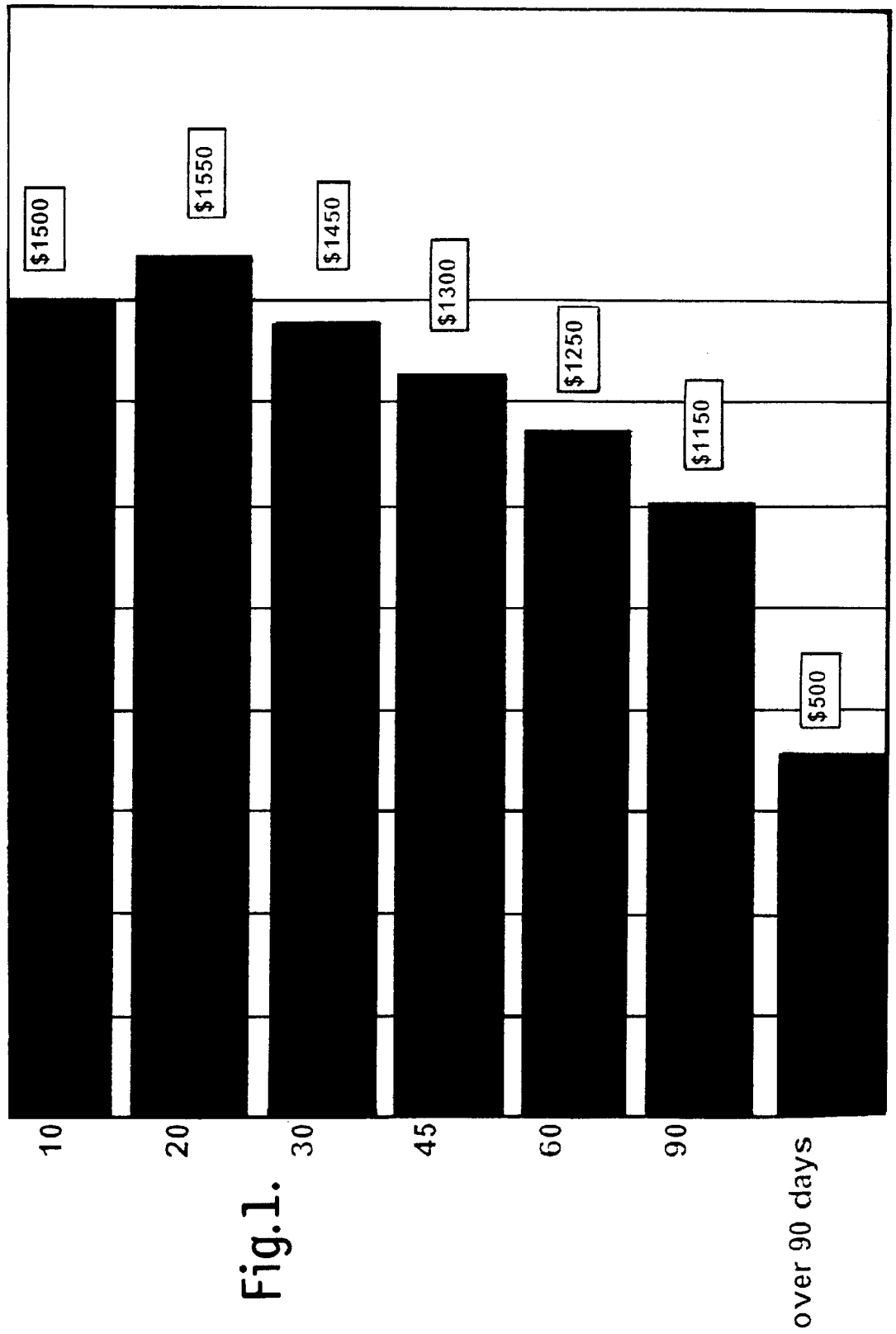
FIG. 1 shows an example of lost profits realized from the sale of inventory that exceeds an inventory age of best profits.

As the Web has become more common and accessible, there has begun a large movement in business to utilize the Web to conduct electronic commerce ("e-commerce"). Companies and distributors are seeking to make sales of their products and services, by way of the Web due in part because of its popularity, ease of use, and accessibility by consumers from all over the world. Many companies have recognized that the use of the Web has reduced overhead. The present invention uses such techniques to optimize inventory age by using the Web to move aged inventory goods.

Due to the advantages of e-commerce, many suppliers have begun to sell their goods and services over the World Wide Web by placing catalogues on Web pages. Such catalogues list content-related information (e.g., product description, price, availability) about the various goods and services offered for sale. However, due to the popularity of the Web in business, numerous Web sites are available that market similar or competing goods or services. Thus, to find the best price for a product or services a consumer may have to visit hundreds of Web pages. A buyer trying to do this without any help can be frustrated and confused as many different competing suppliers must be contacted to determine who can supply the correct product/service at the best price. Accordingly, the invention provides a simple efficient method for the sale of goods having an excess inventory age.

The Web comprises many pages (e.g., files) of information, distributed across many different server computer systems. Information stored on such pages can be, for example, details of a company's organization, contact data, product data and company news. This information can be presented to a computer system (e.g., a "consumer computer system") using a combination of text, graphics, audio data and video data. Each page is identified by a Universal Resource Locator (URL). The URL denotes both the server machine, and the particular file or page on that machine. There may be many pages or URLs resident on a single server.

In order to access and use the Web, a computer system typically runs software known as a graphical "web browser," such as, for example, Microsoft's Internet Explorer, IBM's WebExplorer®, or Netscape's Navigator® program. A consumer or client computer system interacts with the browser to select a particular URL, which in turn causes the browser to send a request for that URL or page to the server identified in the URL. Typically the server responds to the request by retrieving the requested page, and transmitting the data for that page back to the requesting client computer system (the client/server interaction is typically performed in accordance with the hypertext transport protocol ("HTTP")). The selected page is then displayed to the user on the client's display screen. The client may also cause the server to launch an application, for example to search for data relating to particular topic or goods. For example, the application that is launched may cause the local computer server to execute a program to search a database. The program can use terms or identifiers provided by the consumer in searching the database.

Most Web pages are formatted in accordance with a computer program written in a language known as HTML (hypertext mark-up language). This program contains the data to be displayed via the client's browser as well as formatting commands, which tell the browser how to display the data. Thus, a typical Web page includes text together with embedded formatting commands, referred to as tags, which can be used to control the font size, the font style (for example, whether italic or bold), how to lay-out the text, and so on. A Web browser "parses" the HTML script in order to display the text in accordance with the specified format. HTML tags are also used to indicate how graphics, audio and video are manifested to the user via the client's browser.

Most Web pages also contain one or more references to other Web pages, which can be on the same server or a remote server. The user may generally activate such references by selecting a particular location on the screen, typically by clicking a mouse control button. These references or locations are known as hyperlinks, and are typically flagged by the browser in a particular manner (for example, any text associated with a hyperlink may be in a different color or font type). If a user selects the hyperlink, then the referenced page is retrieved and replaces the currently displayed page.

Excess Inventory Age

Typically, goods that remain in inventory begin to affect the "bottom line" of profit for any particular supplier, manufacturer or distributor (as shown in FIG. 1). FIG. 1 shows a graph of the profits recognized by vendors as an inventory of goods ages. "Goods" includes any commercial goods, such as vehicles (e.g., automobiles, motorcycles, tractors, trailers, etc.), clothing, toys and games, books, movies, etc. For example, after about 20 days the profits recognized begin to decline, in part due to the cost associated with maintaining and storing the inventory. Thus, in order to move these goods, suppliers, manufacturers and distributors begin to reduce the price of the goods as they age in inventory in the hopes of "moving" the goods to the consumer. As such, goods in inventory that have exceeded a desired time period or have an excess inventory age are an increased liability to suppliers, manufacturers and distributors and typically are better priced for consumers. "Excess inventory age" means the age of the goods where the profit margin for the goods is reduced by a predetermined amount or percentage (e.g., 10% or more) compared to new goods or goods that are new to inventory. Such excess inventory age can easily be determined by standard accounting principles and inventory reports. Accordingly, identifying goods, through a local or remote database, having an excessive inventory age and providing this information to a consumer benefits the supplier, manufacturer, distributor and consumer.

For example, and not by way of limitation, automobiles that remain in inventory at a dealership affect profit margin. Typically, automobile retailers do not want to carry inventory for more than 30 days. At 60 days, for example, the average cost to dispose of an aged vehicle is in excess of $1,000. This is due, in part, to dealers having to spend money on floor plan costs. The liability of financing or "flooring" combined with advertising expenses and sales incentives, makes disposal of aging inventory a serious question that warrants a solution. The invention as disclosed herein addresses this concern and provides a solution.

Implementation

In one embodiment directed to the automobile industry, the invention provides a forum (e.g. a Web page) for selected dealerships to showcase and move their old inventory at no additional cost. The invention provides a method of constructing a database of aged excess inventory goods (i.e., vehicles). By reducing flooring costs as an incentive, dealerships provide information regarding the vehicles that includes inventory age for any particular item and may include restructured pricing exclusively for backlogged or aged inventory, without sacrificing profit on non-aged goods.

The information provided by the dealerships is compiled and can be made accessible to brokers or consumers either by hardcopy of electronically. In addition, such information can be provided to various dealerships in order for them to adjust their prices in a competitive fashion with those of other dealerships.

Furthermore, by making the database available to consumers as excess inventory, increased demand is created for the vehicles, and a new market emerges to bridge the gaps between automotive retailers, automotive e-commerce and profitability.

Figure 2:
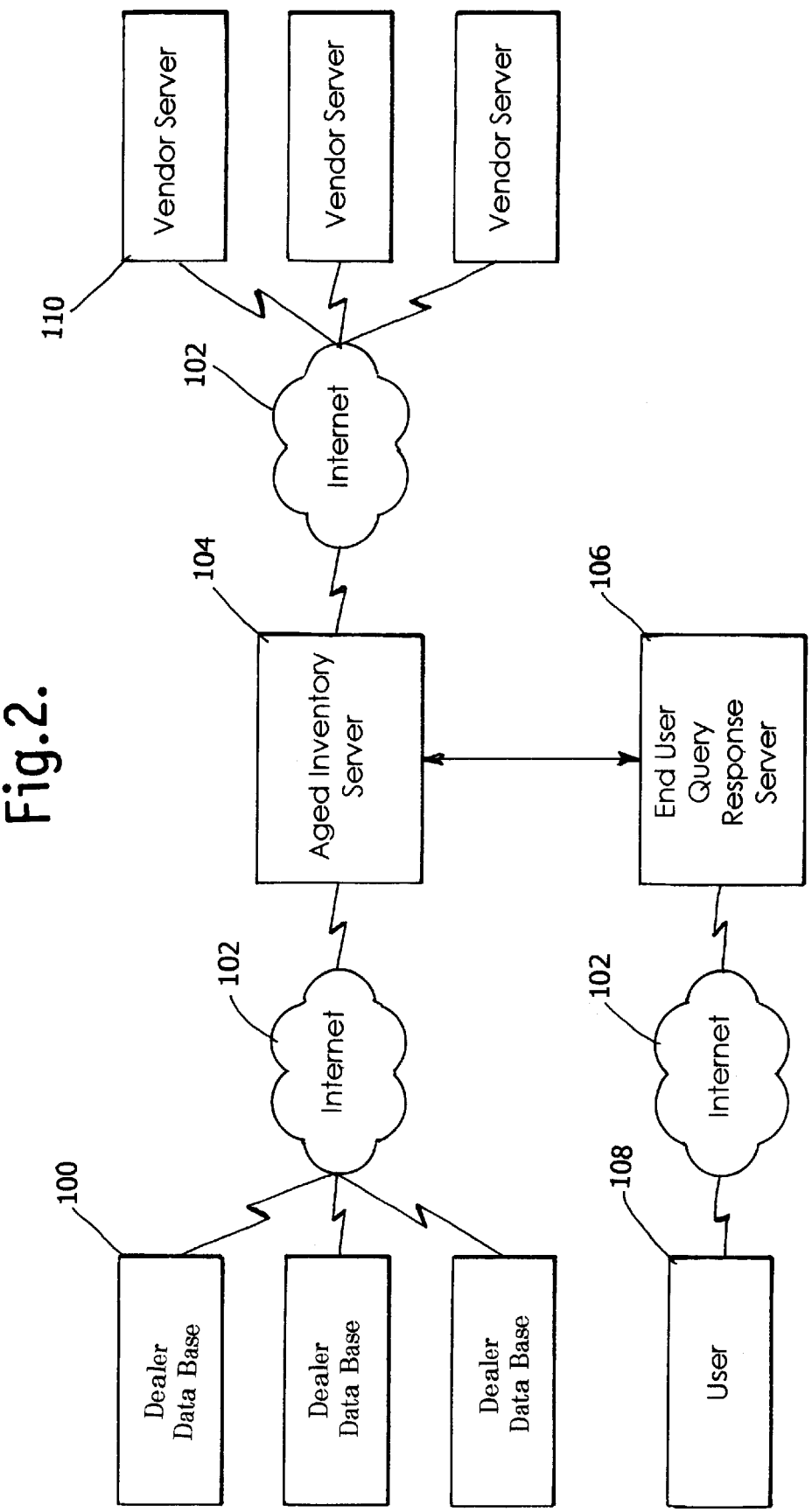
FIG. 2 shows a schematic of the one embodiment of the invention. In this embodiment information regarding the age of goods in inventory is provided by at least one dealership and used to initiate a sale of the goods.

As shown in FIG. 2, one embodiment of the invention involves a central computer system, which receives electronic information containing an inventory age report from at least one vendor (e.g., manufacturers, distributors, dealerships). Although this example describes vehicles and car dealerships, the methods of the invention are applicable to a wide range of goods as described above. With reference to FIG. 2 the central computer system (e.g., an aged inventory server) 104 receives information regarding aged inventory from at least one dealer database 100. This information may be provided by a connection to the dealer database via the Internet 102. Alternative methods of providing data between two remote computer systems are known in the art and include providing the data via hard copy, which can be manually input, or via diskette or data storage medium. The information can include a number of additional parameters in addition to the age of the inventory. Such other parameters include, for example, the make, model, year and color of the goods. The aged inventory information is then made available via the Internet 102 to at least one vendor server 110 or an end user (e.g., a purchaser) 108 in response to an end user query 106.

The information provided by the dealer database 100 is compiled on the aged inventory server 104 and a database created based upon inventory age and the description of the goods as well as any other parameters related to the goods. The information is preferably updated daily but more frequent updates may be desirable depending upon the type of goods and transactions contemplated. As depicted in FIG. 2, the database is used to make a sale of the goods contained within the database having an excessive inventory age. The sale can be made directly to a consumer 108 or to an additional third party 110.

Figure 3:
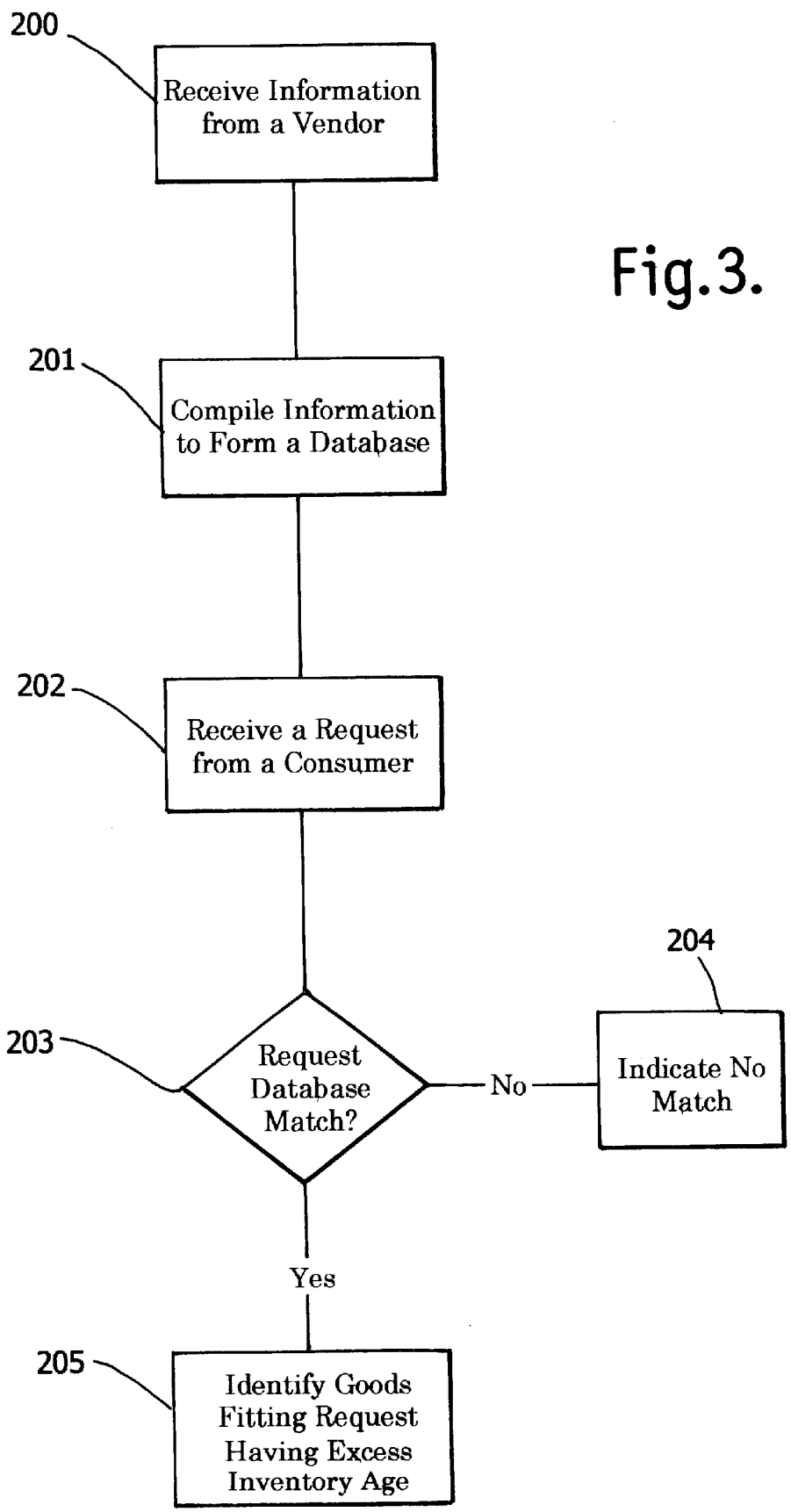
FIG. 3 is a flow chart showing the process by which information is received and processed according to the invention.

FIG. 3 shows the processing of information according to the invention. Information from a at least one dealer or vendor is received (step 200) and compiled (step 201) into a database. This information can include a description of the goods, the price of the goods and the age of the goods in inventory. This information is typically searchable by key word. A request for a particular good may include a number of searchable parameters, for example, make, model, color, model year, location etc. A request for a particular good is received from an end user, consumer or third party vendor (step 202), and the database searched for a match with the goods in the database (step 203). If there is no match, a user interface will respond that no match was found (step 204). However, if a match is found the matching information is used, typically by identifying the goods having an excess inventory age (step 205). Other parameters present in the database associated with the matched goods can also be identified, such as, for example, a description of the goods, location of the goods, and price of the goods.

The identified goods can be used in a number of other methods based upon the purchase or transaction contemplated. For example, identified goods may be "bid" upon over a period of time, similar to an auction. Alternatively, goods that remain in the database of the aged inventory server can be reduced in price bovver a period of time. For example, automobiles that remain on the aged inventory server over a period of 24 hours can be automatically reduced in price on any subsequent 24 hour period that the goods are in inventory. Accordingly, the longer the automobile is in inventory on the server the lower the cost to the consumer based on the reduction in price at the aged inventory server. In addition, it may be desirable to identify any transit cost associated with the goods, or distance from the goods to the consumer. Such information can be readily compiled from the information obtained from a vendor.

The processing of information, creation of an inventory age database and the processing of a request from a consumer can be implemented in hardware or software, or a combination of both (e.g., programmable logic arrays or digital signal processors). Unless otherwise specified, the algorithms included as part of the invention are not inherently related to any particular computer or other apparatus.

In particular, various general purpose machines may be used with programs written in accordance with the teachings herein, or it may be more convenient to construct more specialized apparatus to perform the operations. However, preferably, the embodiment is implemented in one or more computer programs executing on interconnected programmable computer systems (e.g., internet-based client server systems) each comprising at least one processor, at least one data storage system (including volatile and non-volatile memory and/or storage elements), at least one input device or port, and at least one output device or port. The program code is executed on the processors to perform the functions described herein.

Each such program may be implemented in any desired computer language (including machine, assembly, high level procedural, or object oriented programming languages) to communicate with a computer system. In any case, the language may be a compiled or interpreted language.

Each such computer program is preferably stored on a storage media or device (e.g., magnetic, optical, or solid state media) readable by a general or special purpose programmable computer, for configuring and operating the computer when the storage media or device is read by the computer to perform the procedures described herein. The system may also be considered to be implemented as a computer-readable storage medium, configured with a computer program, where the storage medium so configured causes a computer to operate in a specific and predefined manner to perform the functions described herein.

Also, while the preferred embodiment has been described in the context of the World Wide Web, other electronic commerce environments are also contemplated within the scope of the invention.

What is claimed is:

1. A method of performing computer-based on-line commerce of goods, comprising
   receiving information about a plurality goods from at least one vendor, wherein the information includes inventory age;
   compiling the information from the at least one vendor to form a database;
   processing a request from a consumer regarding goods by comparing the request to the database;
   identifying goods fitting the request having an excess inventory age that exceeds an age of best profit; and
   using the information associated with the goods that best fit the request.

2. The method of claim 1, wherein the goods are vehicles.

3. The method of claim 2, wherein the excess inventory age is about 45 days or more.

4. The method of claim 2, wherein the age of best profit is about 45 days or less.

5. The method of claim 1, further comprising updating the database.

6. The method of claim 1, wherein using the information includes linking the consumer to the at least one vendor.

7. The method of claim 6, wherein the at least one vendor is a car dealership.

8. The method of claim 1, wherein the request from the consumer is through a World Wide Web browser application.

9. The method of claim 1, wherein the request is received from the consumer over the Internet.

10. A computer program stored on a computer readable storage medium, comprising instruction to cause a computer to:
    receive a request for goods from a client computer, wherein the request comprises information related to a desired good;
    compare the request to a database, the database comprising information regarding goods including an inventory age report associated with the goods and the location of the goods;
    make decisions as to which goods best fit the request from the client computer;
    identify goods fitting the request having an excess inventory age that exceeds an age of best profit for the good;
    use the information associated with the goods that best fit the request from the client computer.

11. The computer program of claim 10, wherein the client computer runs a World Wide Web browser application.

12. The computer program of claim 10, wherein the request is received from the client computer over the Internet.

13. A system for performing computer-based on-line commerce, comprising a clientserver computing system configured to execute the computer program of claim 10.

14. The system of claim 13, wherein the client computer runs a World Wide Web browser application.

15. The system of claim 13, wherein the request is received from the client computer over the Internet.

* * * * *